(12) United States Patent
Javidan et al.

(10) Patent No.: US 9,555,582 B2
(45) Date of Patent: Jan. 31, 2017

(54) METHOD AND ASSEMBLY FOR ADDITIVE MANUFACTURING

(71) Applicant: Motorola Mobility LLC, Libertyville, IL (US)

(72) Inventors: Ali Javan Javidan, Sunnyvale, CA (US); Carl A Cepress, Santa Clara, CA (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 746 days.

(21) Appl. No.: 13/910,336

(22) Filed: Jun. 5, 2013

(65) Prior Publication Data

US 2014/0333011 A1 Nov. 13, 2014

Related U.S. Application Data

(60) Provisional application No. 61/820,486, filed on May 7, 2013.

(51) Int. Cl.
*B29C 67/00* (2006.01)
*B29L 22/00* (2006.01)

(52) U.S. Cl.
CPC ....... *B29C 67/0055* (2013.01); *B29C 67/0092* (2013.01); *B29L 2022/00* (2013.01)

(58) Field of Classification Search
CPC ............. B29C 67/0055; B29C 67/0092; B29L 2022/00
See application file for complete search history.

(56) References Cited

U.S. PATENT DOCUMENTS 6,682,684 B1 1/2004 Jamalabad et al.
6,682,688 B1 1/2004 Higashi et al.

FOREIGN PATENT DOCUMENTS

| EP | 1057615 A2 | 12/2000 |
| GB | 2479616 A | 10/2011 |
| JP | S60247515 A | 12/1985 |
| WO | 9915293 A1 | 4/1999 |

OTHER PUBLICATIONS

Contex A/S, "Contex DESIGNmate Cx Architecture Design Guide", https://www.hochschule-trier.de/fileadmin/groups/4/pdf/Contex_Architecture_Design_Guide.pdf, downloaded Oct. 29, 2013, 20 pages.
Stratasys Ltd., "Mojo 3D Printer", www.mojo3dprinting.com/printers/default.aspx, printed Mar. 22, 2013, 1 page.
Stratsys Ltd., "Dimension SST Printers", www.dimensionprinting.com/3d-printers/3d-printing-sst.aspx, printed Mar. 22, 2013, 1 page.
Microcubology, "Improvised 3D Printing Support for a Moose", Aug. 3, 2012, http://www.youtube.com/watch?v=0j5ae9LF-rE, 2 pages.

*Primary Examiner* — Robert J Grun
(74) *Attorney, Agent, or Firm* — Marshall, Gerstein & Borun LLP

(57) ABSTRACT

An additive manufacturing method (1600) may involve additive manufacturing (1602) a walled structure (e.g., a shell or an enclosure) onto a print bed, positioning (1604) a support piece having a non-stick surface (e.g., a Teflon®) near or inside the structure, additive manufacturing (1606) a layer of material onto one or more walls and onto the support piece to create an overhang, and removing (1616) the support piece after the material making up the overhang has returned to a solid state or hardened.

16 Claims, 16 Drawing Sheets

METHOD AND ASSEMBLY FOR ADDITIVE MANUFACTURING

TECHNICAL FIELD

The present disclosure relates generally to additive manufacturing and, more particularly, to the use of support structures in 3D printing.

BACKGROUND

Additive manufacturing (often referred to as 3D printing) is a process that creates or augments a three-dimensional object by laying down successive layers of material, typically onto a print bed, to form a structure having desired dimensions. Additive manufacturing has become widespread in recent years, and is used to create everything from simple tools to components of complex devices. 3D printers are important tools in this field.

One common use for additive manufacturing is for prototyping. Manufacturing companies create prototypes to determine whether an envisioned product is feasible, practical, and aesthetically pleasing. The practice of "rapid prototyping" has become the standard for many industries. Rapid prototyping allows a business to create a three-dimensional model of a product within hours.

For rapid prototyping, a commonly used additive manufacturing technique is extrusion deposition or Fused Deposition Modeling (FDM). An FDM-capable printer takes a raw material, usually in the form of a filament, extrudes it, heats it until it becomes soft, and deposits the material onto a non-printed platform (known as a print bed) along a predefined path. The material then cures and hardens. After multiple passes along the path, the material accumulates and eventually takes the shape of the desired "model."

Other types of additive manufacturing include (1) coating, which involves spreading a layer of material over a surface; and (2) pad printing, which uses a pad (often made of silicone) to transfer an image from an etched printing plate that is filled with material (such as ink) to an object.

There are certain structures, however, that are inherently challenging to create using additive manufacturing. One such structure is referred to as an "overhang." An overhang is a part of a model that is meant to be suspended without any material underneath. An example of an overhang is a bridge. If an overhang is too long, it may sag before the material of the overhang has a chance to cure.

The most common way for 3D modelers to create an overhang is to 3D print an initial structure, commonly known as a "support structure," onto a print bed, and then to print the overhang on top of the support structure. Examples of printed support structures include an FDM lattice support and a stereolithography (SLA) 'bed of needles.' After the model is complete, the modeler removes the support structure material, e.g., by breaking it off or chemically dissolving it.

In some cases, the support structure material can be washed off with water, e.g., a PolyJet™ support structure printed by an Objet™ 3D printer manufactured by Stratasys Ltd. Having to remove the support structure from the model results in wasted material. Additionally, the surfaces remaining after the support structure is removed have a generally rough texture that may need to be smoothed out using an additional process (e.g., polishing).

DRAWINGS

While the appended claims set forth the features of the present techniques with particularity, these techniques may be best understood from the following detailed description taken in conjunction with the accompanying drawings of which:

DETAILED DESCRIPTION

Figure 1:
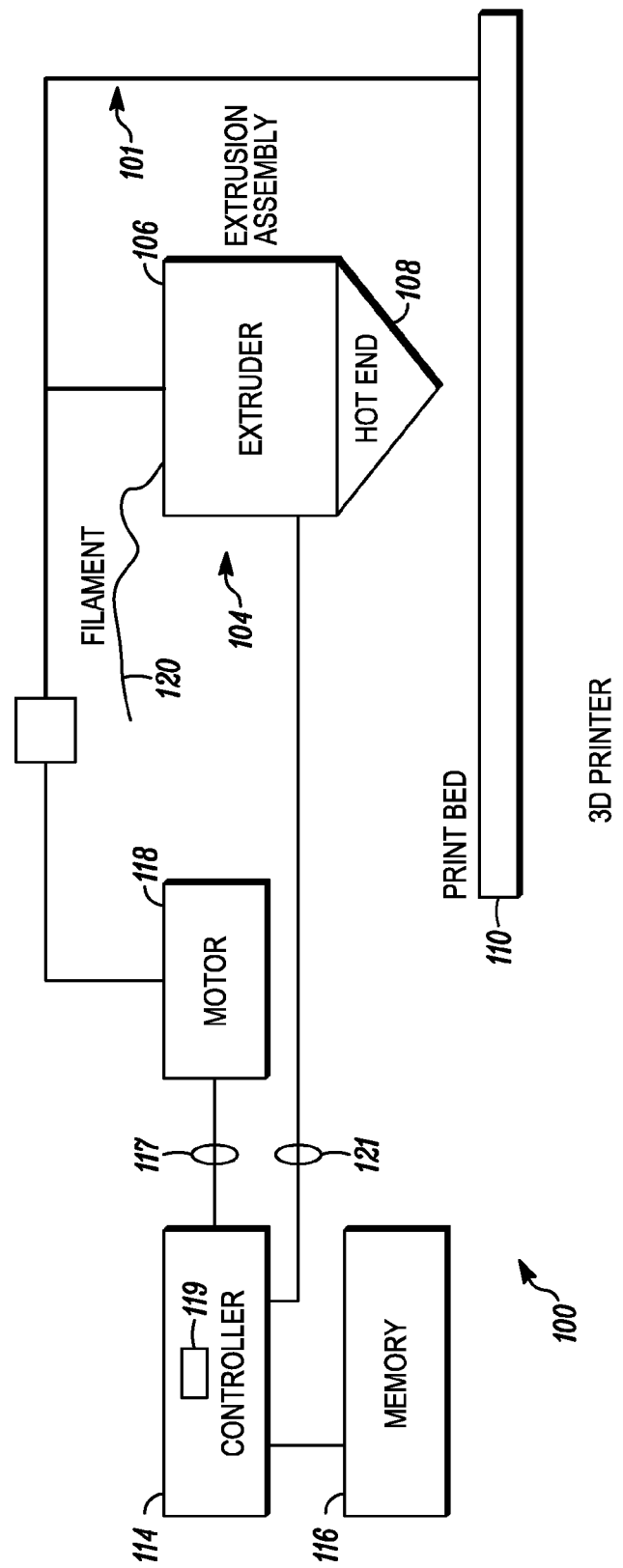
FIG. 1 shows an example of a simplified 3D printer schematic that may be used in conjunction with embodiments.

Turning to the drawings, wherein like reference numerals refer to like elements, techniques of the present disclosure are illustrated as being implemented in a suitable environment. The following description is based on embodiments of the claims and should not be taken as limiting the claims with regard to alternative embodiments that are not explicitly described herein An embodiment of a method for additive manufacturing involves additive manufacturing a walled structure (e.g., a shell or an enclosure) onto a print bed, placing a support piece with a non-stick surface (e.g., Teflon®) near or inside the structure, additive manufacturing a layer of material onto one or more walls and onto the support piece to create an overhang, and removing the support piece after the material making up the overhang has returned to a solid state or hardened.

In some implementations, the structure is a shell having a cavity inside, with the first face of the shell having the overhang. The method may include repositioning the shell (with the support piece still inside the cavity) so that the first face is down on the print bed and a second face of the shell faces up. A second support piece may then be placed on top of the first support piece. The method may further include additive manufacturing a second overhang on the second face. More specifically, a layer of material may be deposited onto at least one of the walls and onto the second support piece. In some embodiments, the second overhang restricts the second opening.

In one embodiment, the shell is placed on a second print bed after being flipped. The second print bed may have protrusions that are configured for receiving the first overhang.

According to some embodiments, the support piece or pieces are removed from the cavity—either through an opening in the first face or an opening in the second face.

In yet another embodiment, a method for additive manufacturing is carried out by additive manufacturing walls of an enclosure on a print bed; positioning a support piece within the enclosure on the print bed; additive manufacturing an overhang extending from at least one of the walls onto the support piece; removing the enclosure from the print bed; and removing the support piece from the enclosure.

Each support piece may be a single piece or have multiple, interlocking sections, and have non-stick smooth or textured surfaces. Specific materials for the support pieces may include, Teflon®, Polytetrafluoroethylene, aluminum, stainless steel, anodized aluminum, and ceramic.

Still another embodiment is an assembly that includes a first print bed and an additive-printed structure disposed thereon. The structure has an overhang and an inner surface that defines a cavity. The assembly further includes a reusable support piece disposed on the first print bed within the cavity. The support piece is in contact with an underside surface of the overhang and provides support to the overhang when the overhang is in a partially liquid state.

The various embodiments described herein may be used for additive manufacturing a variety of different objects. For example, one or more of these methods could be used to prototype a case for a smart phone or for other electronic devices. Such a case may include any of a variety of materials, including those listed below for the filament 120 (FIG. 1). This is true regardless of the type of additive manufacturing process used to create the case.

The term "operator" as used herein means an entity that operates one or more of the devices described herein. An operator may be a person, or may be another device such as an automated assembly device, robot, computing device, etc.

The terms "additive manufacture" and "additive manufacturing" as used herein refer the process of creating a three-dimensional object by laying down successive layers of material to form a structure having predetermined dimensions. Additive manufacturing includes deposition printing (including FDM), coating, pad printing, Selective Laser Sintering (SLS), Stereolithography (SLA), and PolyJet™ 3D printing.

The terms "3D print," "3D printing," "print," and "printing" as used herein refers additive manufacturing using a 3D printer.

FIG. 1 shows a simplified schematic of a 3D printer that may be used in conjunction with the disclosed techniques. In this embodiment, the 3D printer uses deposition printing technology with temperature-based curing. An alternate additive manufacturing technology is a sprayed photopolymer with ultraviolet light curing. Still other additive manufacturing methods may be substituted.

The 3D printer 100 has a frame 101 and a substantially planar first print bed 110. The first print bed 110 is attached to and removable from the frame 101. As will be described below, an operator may, in an embodiment, detach the first print bed 110 and replace it with a second print bed. Alternatively, the operator may attach a second print bed to the frame 101 so that the second print bed is on top of the first print bed 110. The 3D printer 100 also includes a motor 118 that is attached to the frame 101, and an extrusion assembly 104 that is coupled to the motor 118. The extrusion assembly 104 is positioned above the print bed 110 and is movable along one or more axes of the frame 101. The 3D printer 100 further includes a programmable controller 114 that is electrically coupled to the motor 118 via a conductive pathway 117. The controller 114 has a memory 116. The 3D printer 100 also has a data interface 119 that is electrically coupled to the controller 114.

Referring still to FIG. 1, the extrusion assembly 104 has an extruder 106 and a hot end 108 coupled to the extruder 106. The controller 114 is electrically coupled to the extruder 106 via a conductive pathway 121. To program the 3D printer 100, the operator establishes a data connection with the 3D printer 100 via the data interface 119, and transfers instructions (e.g., CAD instructions) to the controller 114, which stores the instructions in its memory 116.

Referring again to FIG. 1, a filament 120 is loaded into the extruder 106. The filament 120 includes a material that liquefies (i.e., softens) when heated. Examples of possible materials include thermoplastic materials, Polylactic acid (PLA) materials, Acrylonitrile Butadiene Styrene (ABS) materials, rubberized materials, silicones, acrylics, polyamide (nylon), glass filled polyamide, stereolithography materials (epoxy resins), silver, titanium, steel, wax, photopolymers, and polycarbonate. In some embodiments, there are multiple filaments of varying appearance or composition. For example, there may be a first filament that is blue wax and a second filament that is white wax.

When the 3D printer 100 operates, the controller 114 retrieves the instructions from the memory 116, processes the instructions, and translates the instructions into commands that the motor 118 and the extruder 106 recognize. The controller 114 transmits commands to the motor 118, which responds by driving the extrusion assembly 104 to move along one or more paths, and to the extruder 106, which responds by heating the hot end 108, and by forcing the filament 120 through a constricted passage in the hot end 108. The hot end 108 heats the filament 120 until the filament is in a liquid state. The hot end 108 deposits the liquefied filament onto the print bed 110. The liquefied filament is then cured until it sufficiently hardens. Possible curing methods include Ultraviolet (UV) curing and thermal curing (e.g., by cooling or by being subjected to heat).

The motor 118 drives one or more pulleys or other mechanisms (not shown) to move the extrusion assembly 104 up, down, or laterally relative to the print bed 110. In some embodiments, there are multiple motors such as one motor per axis of motion. The path that the motor 118 drives the extrusion assembly 104 is determined by the commands provided to the motor 118 by the controller 114.

Various methods that are carried out in embodiments of the disclosure will now be described with reference to FIGS. 2-15.

Figure 2A:
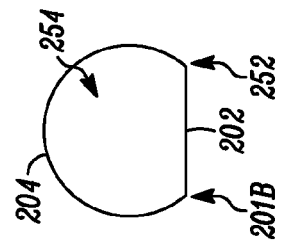
FIG. 2-FIG. 5 and FIG. 7-FIG. 15 illustrate steps carried out according to embodiments of the disclosure as well as structures resulting from those steps.
Figure 2:
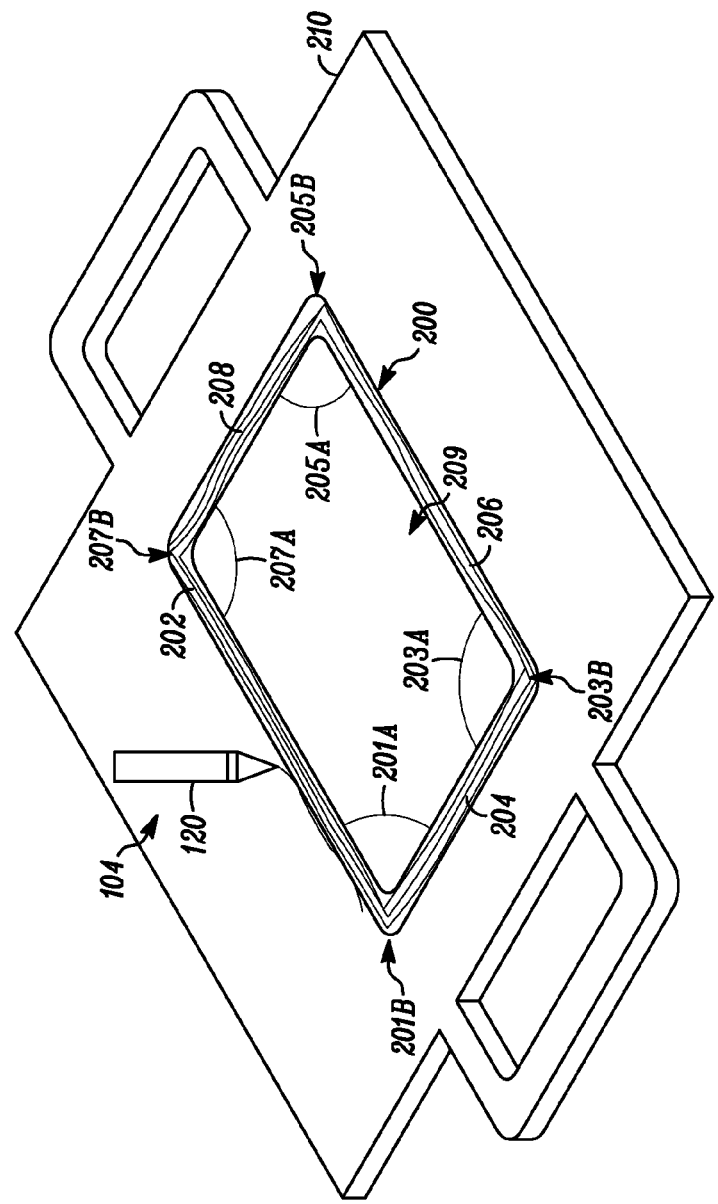

Referring to FIG. 2, the 3D printer 100 prints thermoplastic material onto a print bed 210 along a predetermined path, thereby forming a structure 200 that has a first wall 202 and a second wall 204. The first wall 202 and the second wall 204 meet at a first angle 201*a* to form a first corner 201*b*. The 3D printer 100 prints a third wall 206, and extends the second wall 204 to the third wall 206. The second wall 204 and the third wall 206 meet at a second angle 203*a* to form a second corner 203*b*. The first wall 202, the second wall 204, the third wall 206, and the fourth wall 208 define an interior portion 209.

Although four walls are shown, the number of walls may be greater or less than four depending on the particular structure 200 being printed.

Referring still to FIG. 2, the 3D printer prints a fourth wall 208. The third wall 206 and the fourth wall 208 meet at a third angle 205*a* to form a third corner 205*b*. The fourth wall 208 and the first wall 202 meet at a fourth angle 207*a* to form a fourth corner 207*b*. The first, second, third, and fourth corners may be sharp, rounded, partially sharp, or partially rounded. The 3D printer may make multiple passes along this four-walled structure to build the thermoplastic material to the designed height and thickness, as will be shown more extensively in FIG. 3.

In another embodiment, FIG. 2A shows two walls, the 3D printer extends the second wall 204 along a generally U-shaped path so that the second wall 204 and the first wall 202 meet again to form a second corner 252. In this embodiment, the first wall 202 and the second wall 204 define a cavity 254. Alternatively, the 3D printer extends the first wall 202 to the second wall 204 to form a second corner.

Figure 3:
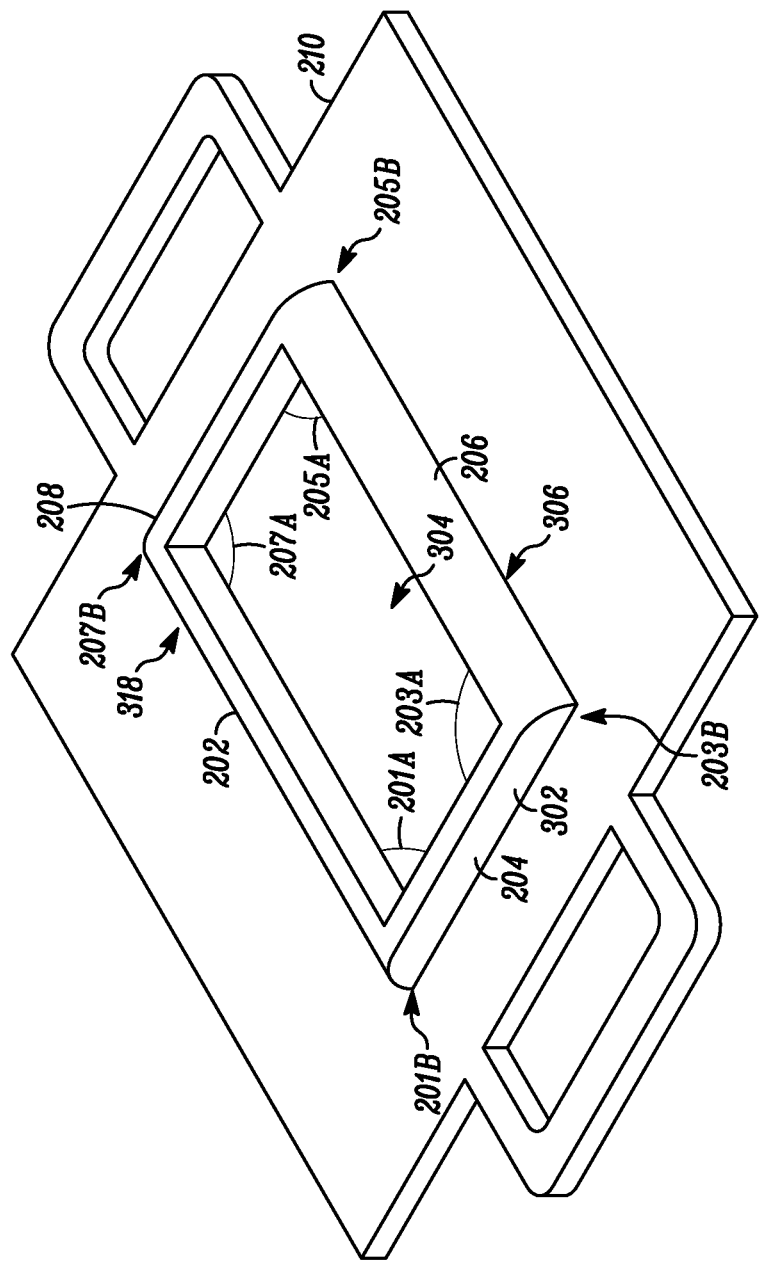

Referring to FIG. 3, the first wall 202, second wall 204, third wall 206, and fourth wall 208 together form a built-up enclosure 306 having an interior cavity 304 and a first face 318. A first opening 302 of the interior cavity 304 is located on the first face 318. A second face of the enclosure 306 and a second opening of the interior cavity 304 will be described with respect to FIGS. 8 and 10, respectively.

Figure 4:
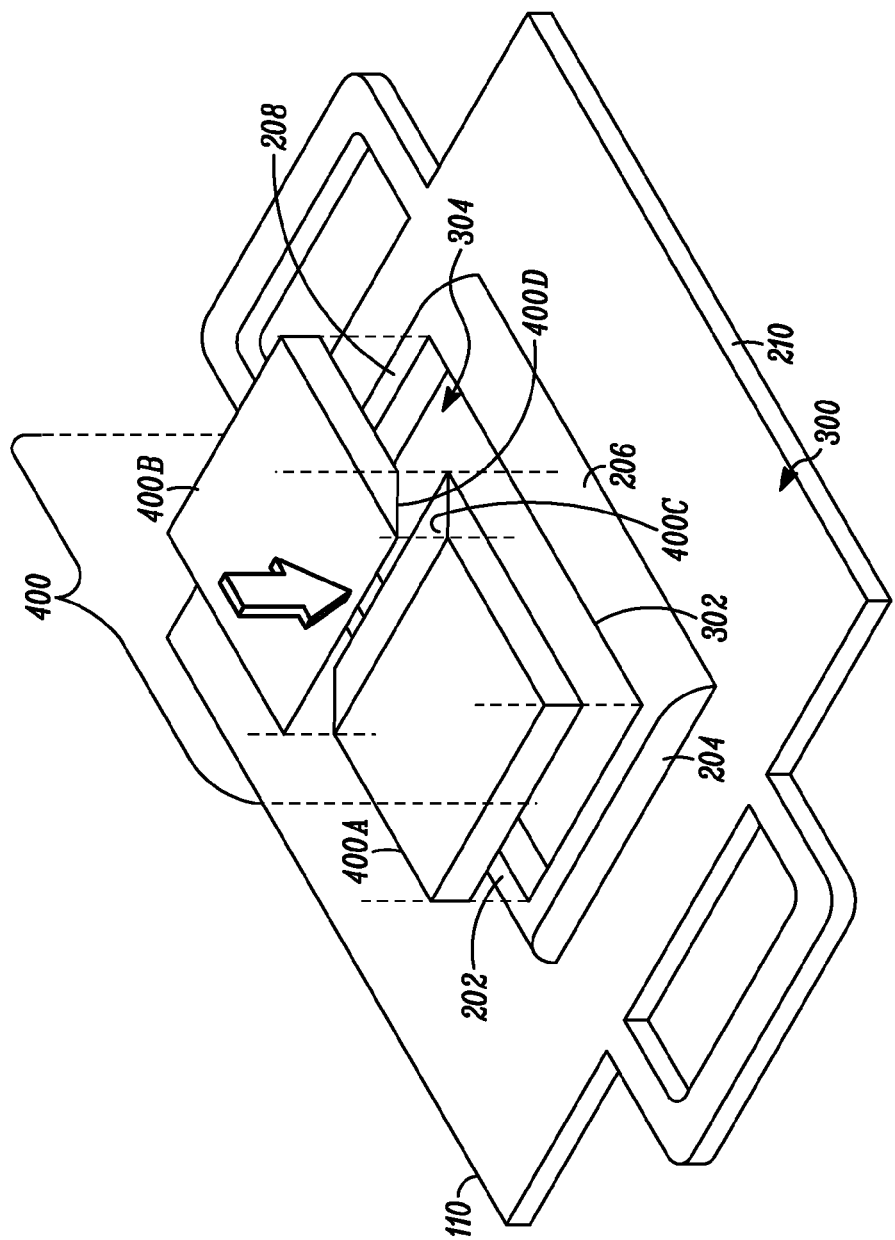

Referring to FIG. 4, an operator inserts a first support piece 400 into the interior cavity 304 through the first opening 302. The first support piece 400 has a first section 400a, and a second section 400b. The operator positions the first support piece 400 onto the print bed 210 so that the first support piece 400 is: (a) proximal to the first wall 202, the second wall 204, the third wall 206, and the fourth wall 208; (b) (see FIG. 3) within the interior of the first angle 201a, the interior of the second angle 203a, the interior of the third angle 205a, and the interior of the fourth angle 207a; and (c) (see FIG. 3) freestanding with respect to the first wall 202, the second wall 204, third wall 206, and the fourth wall 208. The first support piece 400 may include a variety of surface materials, including non-stick materials, Teflon®, Polytetrafluoroethylene (PTFE), aluminum, stainless steel, anodized aluminum, and ceramic.

Referring still to FIG. 4, the first section 400a and the second section 400b of the first support piece 400 have respective angled surfaces 400c, 400d. The first section 400a and the second section 400b laterally interlock at these angled surfaces. It is to be noted that the first and second sections 400a and 400b may interlock in other ways, such as with a tongue and groove configuration.

Figure 5:
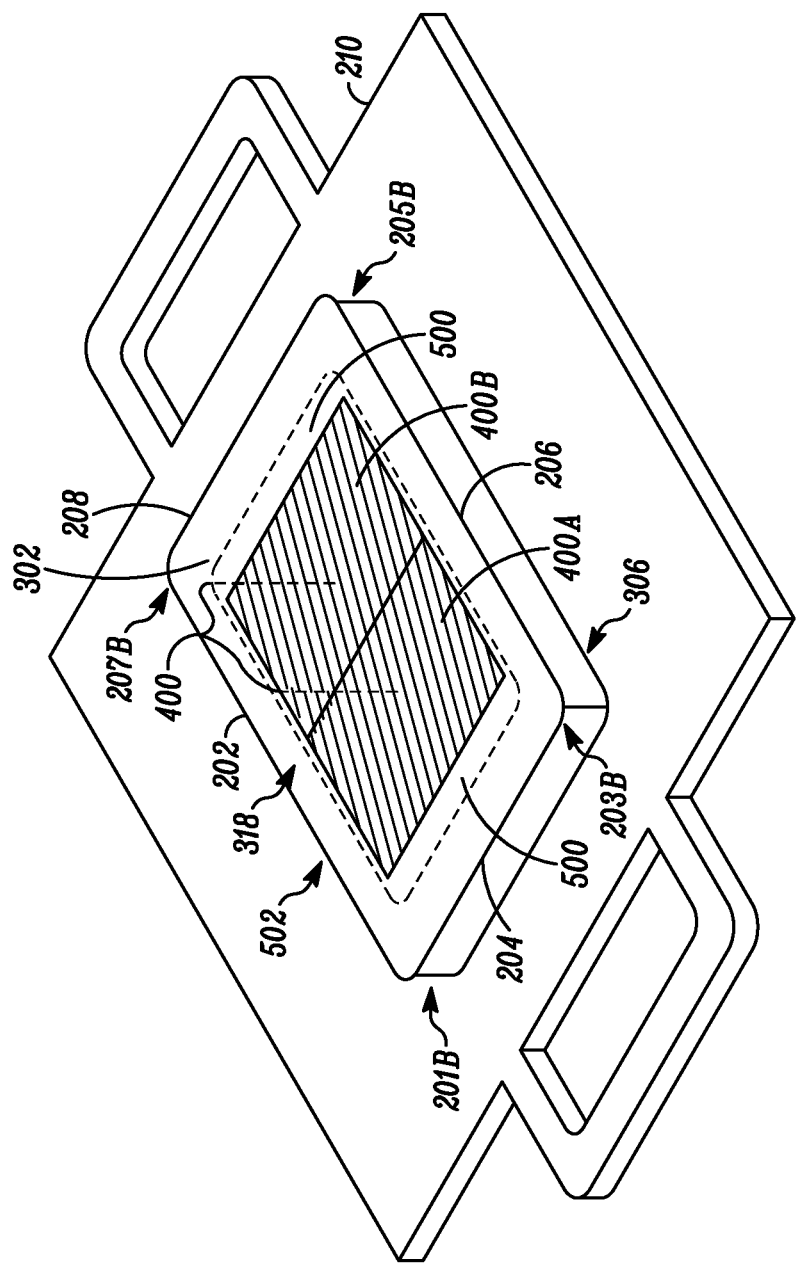
Figure 7:
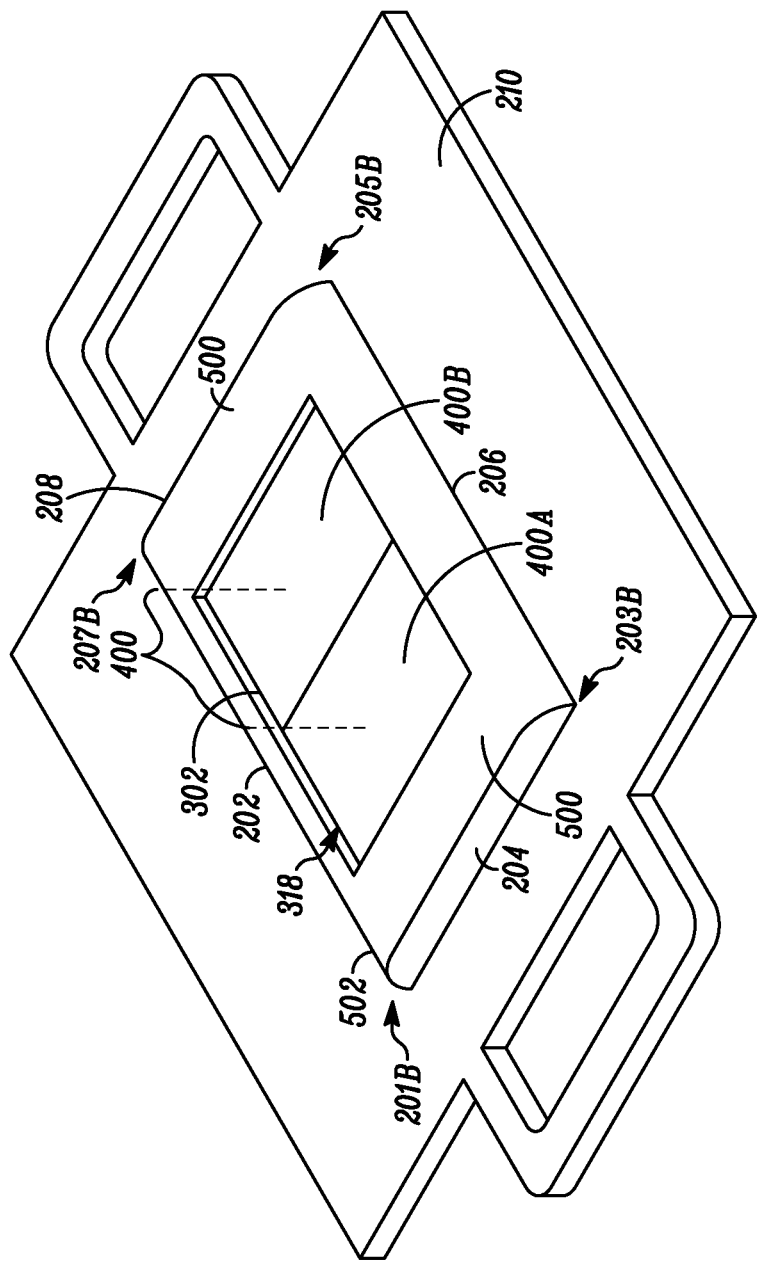

Referring to FIGS. 5 and 7, the 3D printer prints additional thermoplastic material onto the first wall 202, onto the second wall 204, and onto the first support piece 400. This process creates a first overhang 500 on the first face 318. In this example, the first overhang 500 extends from the first wall 202, the second wall 204, the third wall 206, and onto the first section 400a of the first support piece 400. The first overhang 500 also extends from the first wall 202, from the third wall 206, from the fourth wall 208, and onto the second section 400b of the first support piece 400.

Figure 6:
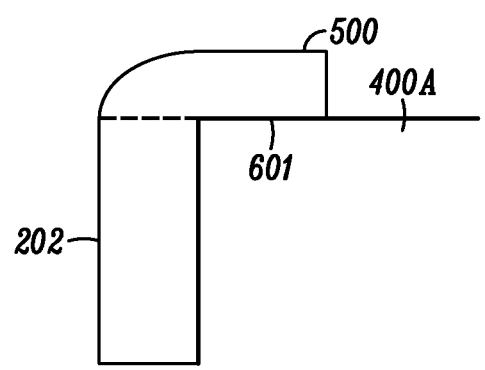
FIG. 6 is a sectional view along line I-I of FIG. 5.

Referring to the FIG. 6, which is a sectional view along line I-I, the first section 400a makes contact with an underside 601 of the first overhang 500. Such contact may occur between the overhang and the first support piece 400 at any point where they are in proximity to one another. This contact allows the first support piece 400 to provide support to the first overhang 500. The first overhang 500 at least partially blocks the first opening 302. The texture of the underside 601 of the first overhang 500 is dependent on the surface texture of the first section 400a. In one embodiment, the surface texture of the first section 400a is smooth, and the texture of the underside 601 of the first overhang 500 is also smooth.

In an embodiment, the first support piece 400 at least partially supports the first overhang 500, particularly while the first overhang 500 cures and returns to a solid state. The support provided by the first support piece 400 reduces the need to 3D print a support structure. Furthermore, because the first support piece is reusable, there is less waste of material as compared to a 3D-printed support structure, which likely needs to be removed from the main structure and disposed of.

Referring still to FIGS. 5, 6, and 7, the first wall 202, the second wall 204, the third wall 206, the fourth wall 208, and the first overhang 500 together constitute a shell 502. The first face 318 of the enclosure 306 also constitutes the first face of the shell 502.

Figure 8:
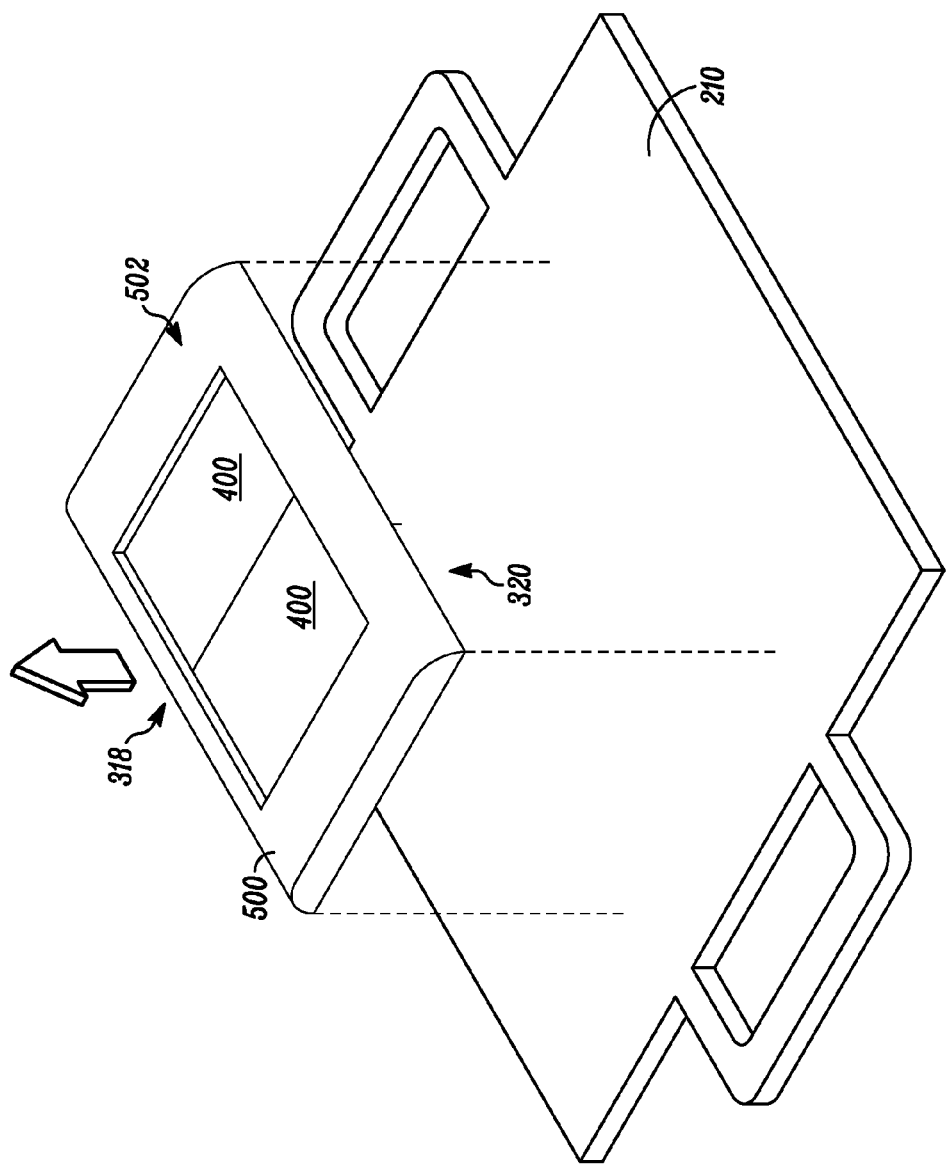

After the first overhang 500 is 3D printed, the operator removes the shell 502, with the first support piece 400 inside, from the print bed 210, as shown in FIG. 8. Also indicated in FIG. 8 is the second face 320 of the shell 502.

Figure 9:
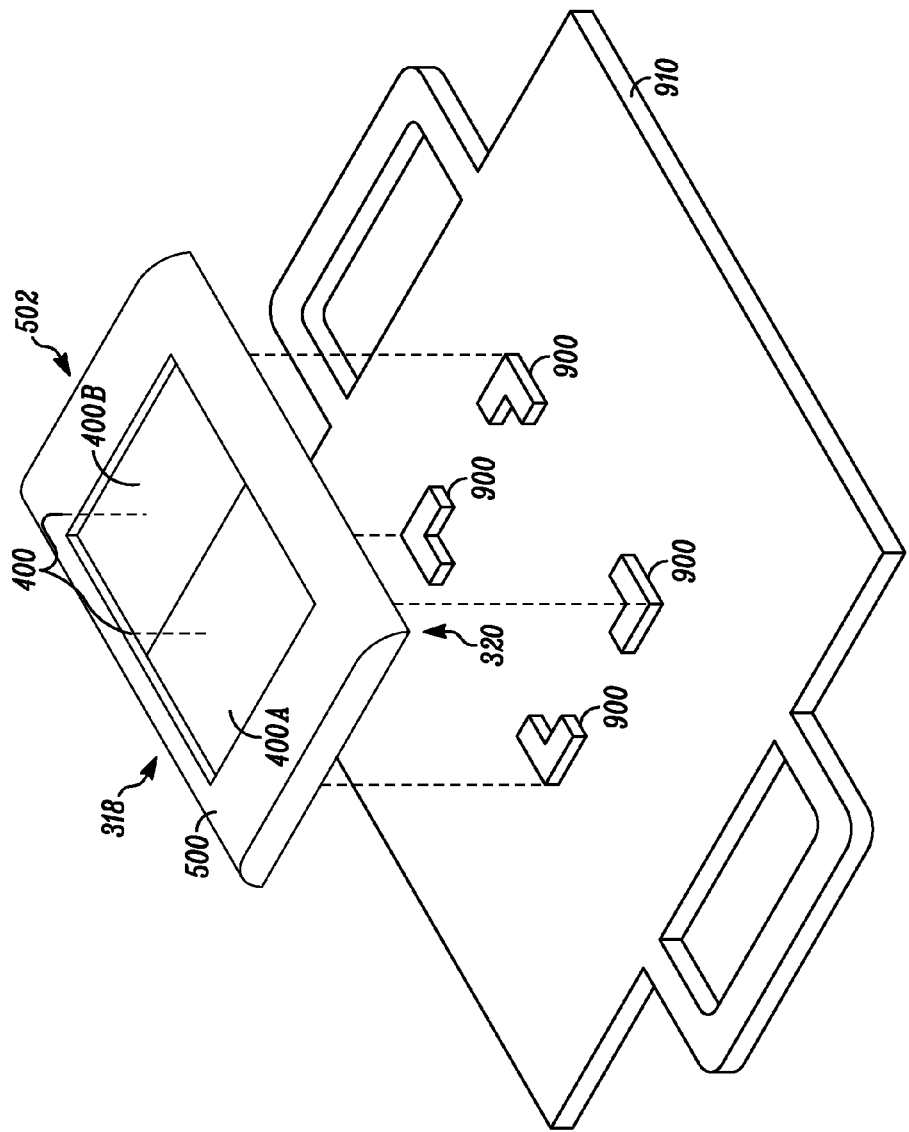

Referring to FIG. 9, the operator replaces the first print bed 210 with a second print bed 910. The surface of the second print bed 910 has protrusions 900. The protrusions are positioned and configured to receive the overhang 500 of the first face 318. Although four protrusions are depicted, any suitable number may be used. In an alternative embodiment, the characteristics of the first print bed 210 and of the second print bed 910 are in a single print bed, with one side smooth and the other side having the protrusions 900. In such an embodiment, the operator need only turn the print bed over.

Figure 10:
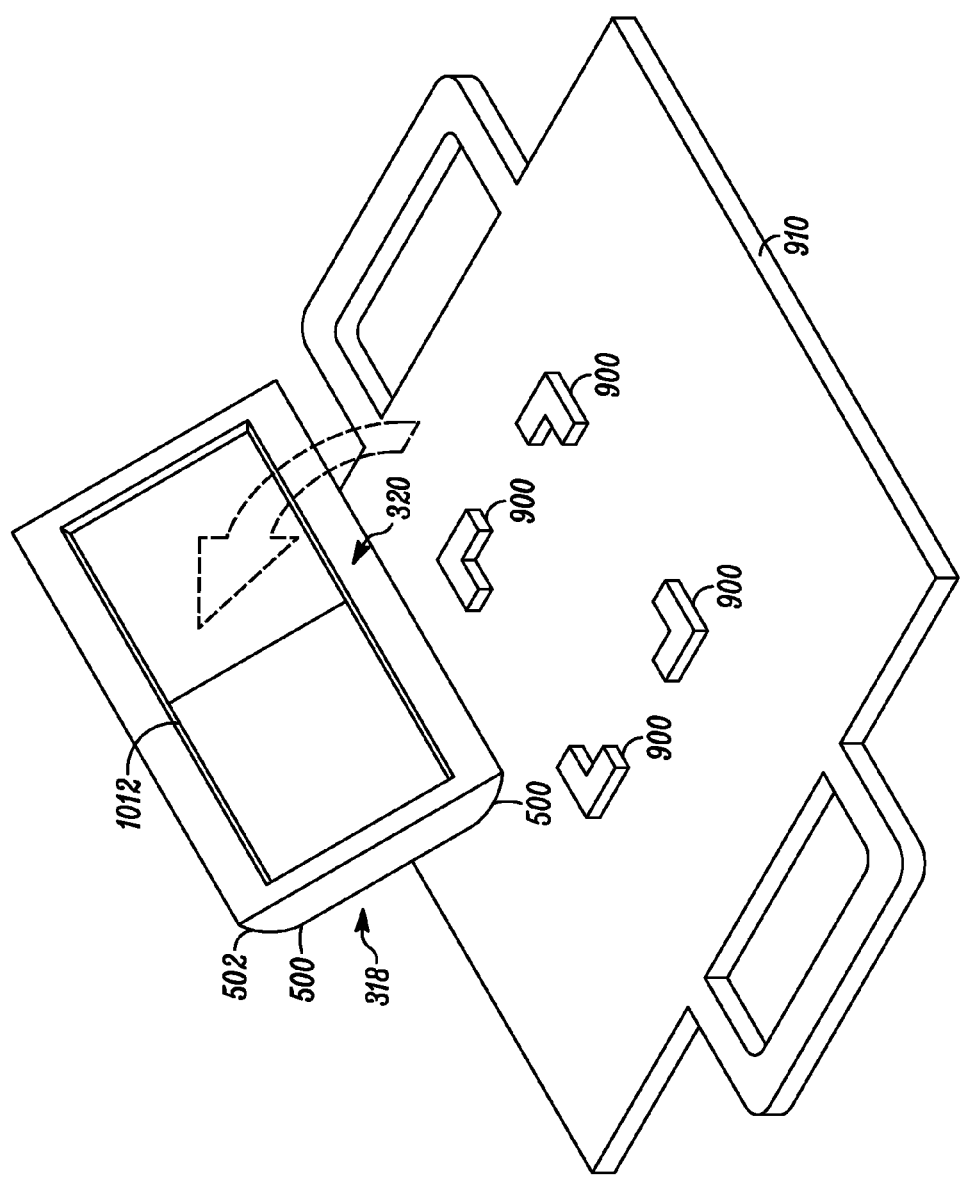

After replacing the first print bed 210 with the second print bed 910, the operator repositions the shell 502 as shown in FIG. 10. The second face of the shell 502 has an opening 1012, shown in FIG. 10. Alternatively, the second print bed 910 may already be on the 3D printer 100 (FIG. 1) as previously discussed. In those implementations having only one print bed with two sides (one side having characteristics of the first print bed 210, and the other side having protrusions 900 like those shown in FIG. 9) the operator may turn the print bed over so that the other side is accessible.

Figure 11:
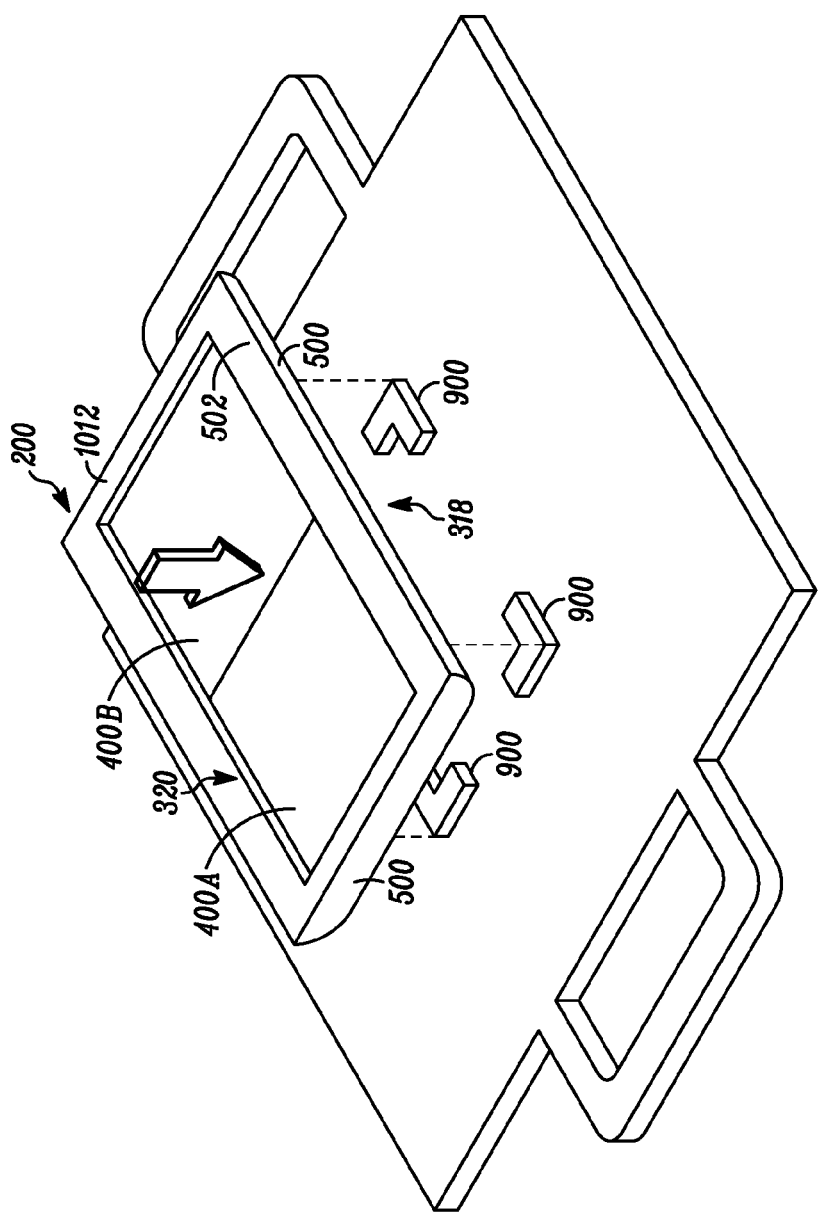

Referring to FIG. 11, the operator positions the shell 502 onto the second print bed 910 so that the first face 318 makes contact with the surface of the second print bed 910. More specifically, the protrusions 900 of the second print bed 910 receive the first overhang 500 and hold the shell 502 in place.

Figure 12:
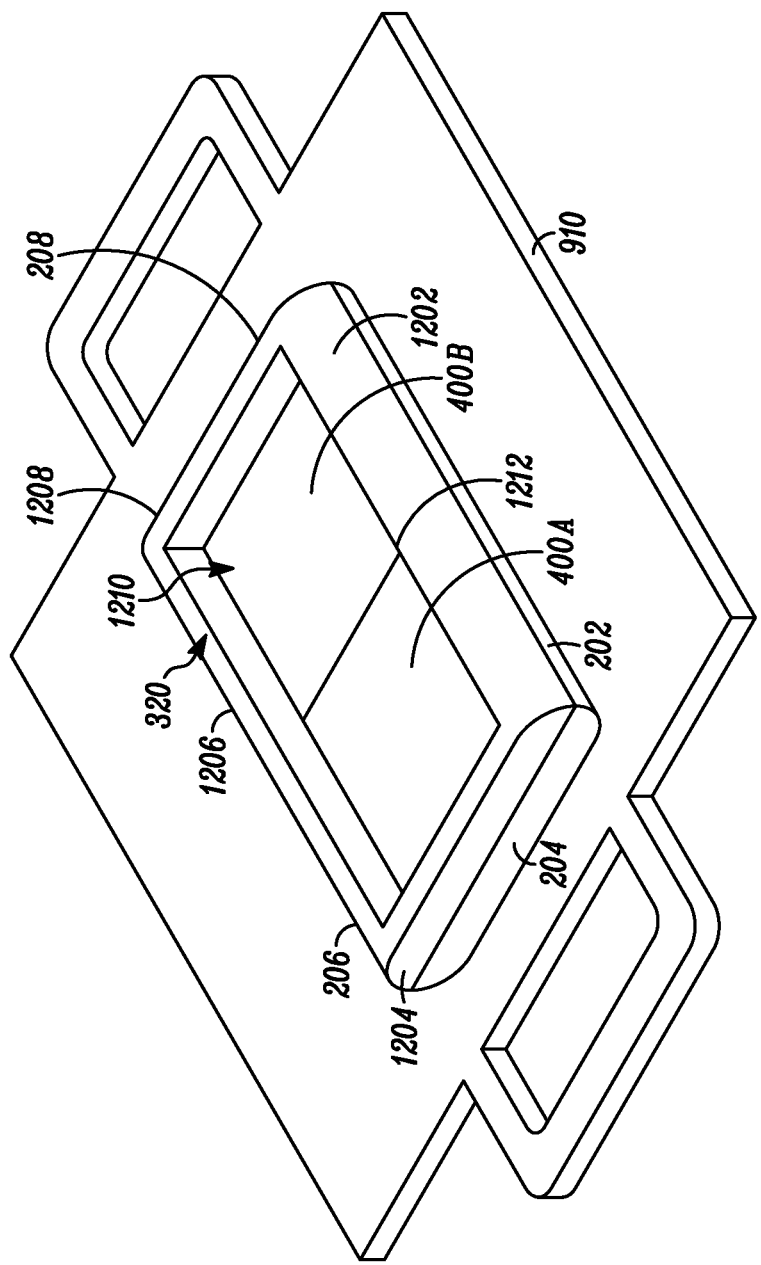

Referring to FIG. 12, the 3D printer prints a first extension 1202 to the first wall 202, a second extension 1204 to the second wall 204, a third extension 1206 to the third wall 206, and a fourth extension 1208 to the fourth wall 208. Together, inner surfaces of the first extension 1202, the second extension 1204, the third extension 1206, and the fourth extension 1208 define an extended cavity 1210. On the second face 320 of the shell 502, there is an opening 1212 of the extended cavity 1210.

Figure 13:
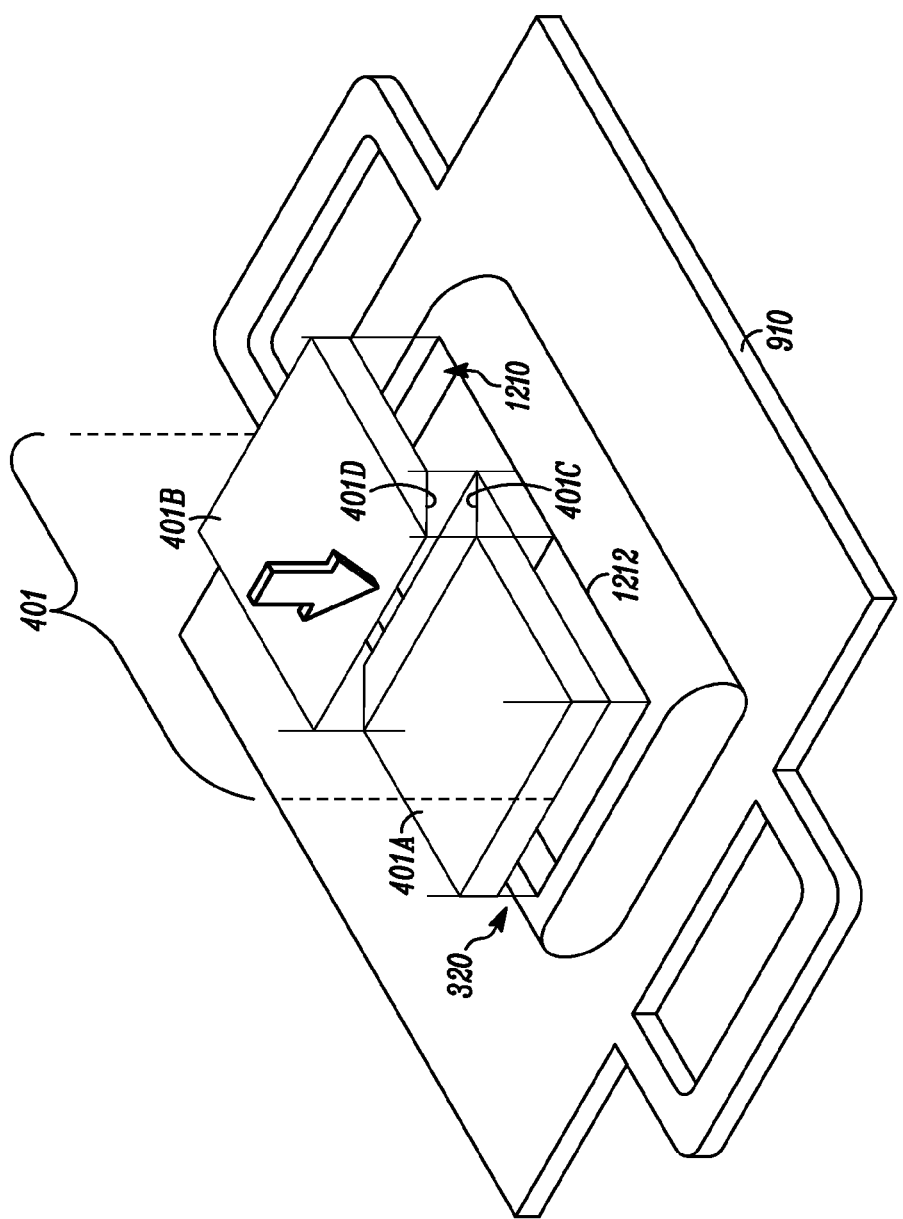

Referring to FIG. 13, the operator inserts a second support piece 401 into the extended cavity 1210 via the opening 1212 of the extended cavity 1210. The operator stacks the second support piece 401 onto the first support piece 400. The second support piece 401 has a first section 401a and the second section 401b. In one embodiment, the second support piece 401 has the same shape, uses the same materials, and has the same two-section interlocking configuration (i.e., each section interlocking with the other at angled surfaces 401c and 401d) as the first support piece 400. In other embodiments, the first support piece 400 and the second support piece 401 are different from one another with regard to one or more of these characteristics.

Figure 14:
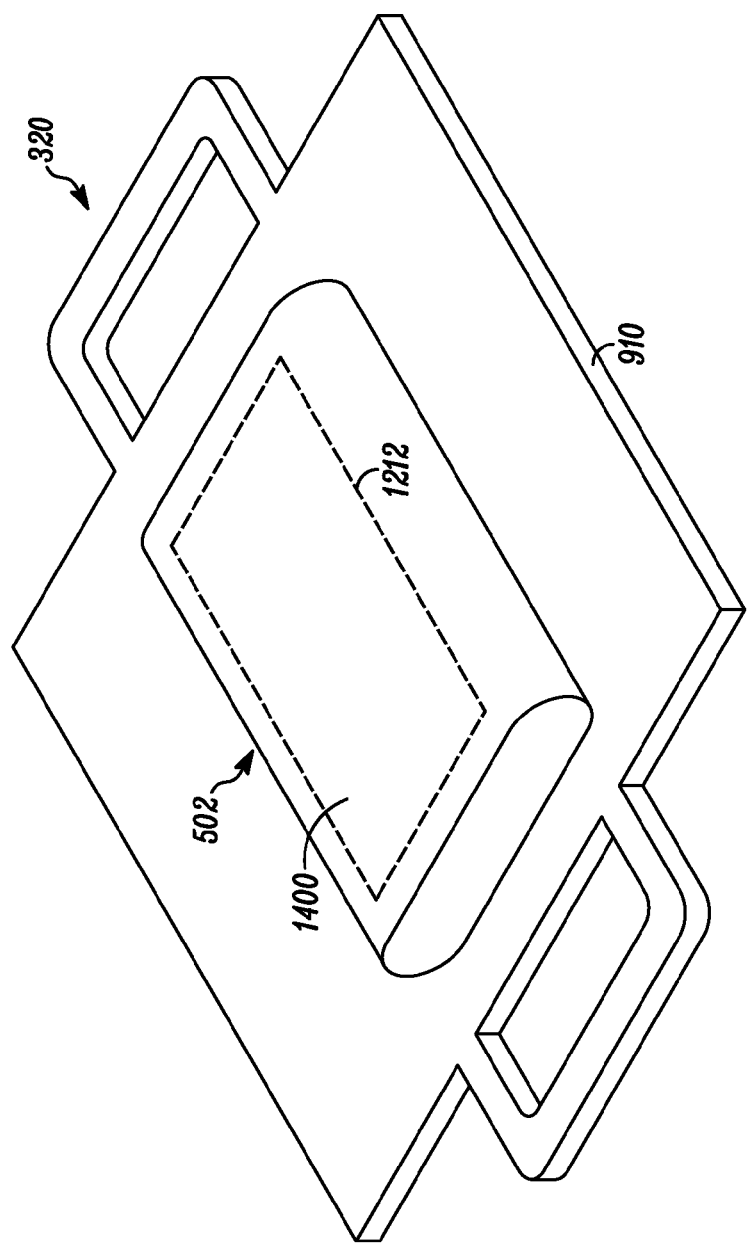

Referring to FIG. 14, the 3D printer prints a second overhang 1400. The second overhang 1400 may extend from one or more of the first, second, third, and fourth walls and is depicted in FIG. 14 as extending from the first wall 202, the second wall 204, the third wall 206, and the fourth wall 208, and onto the second support piece 401. The second overhang 1400 restricts the opening 1212 of the extended cavity 1210 and, as depicted in FIG. 14, may entirely block the opening 1212 of the extended cavity 1210.

Figure 15:
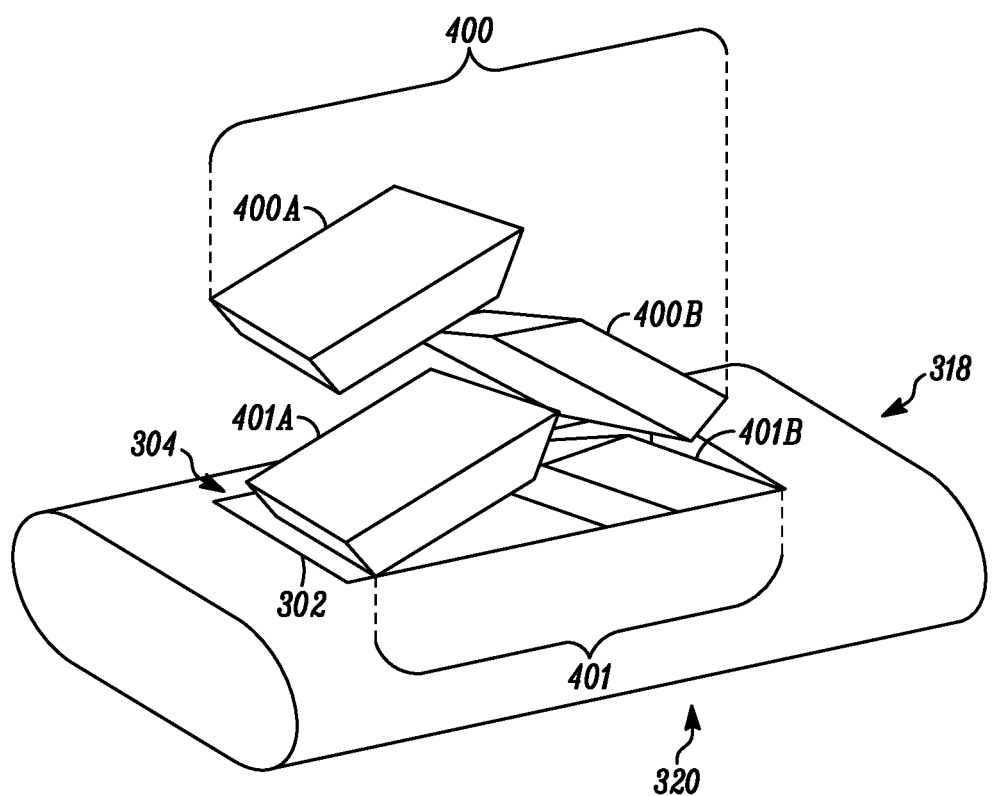

After the 3D printer prints the second overhang 1400, the operator removes the shell 502 from the second print bed 910, and, as shown in FIG. 15, removes the first support piece 400 (including any of its sections) and the second support piece 401 (including any of its sections) from the shell 502 via the opening 302 in the first face 318.

In an embodiment, the filament 120 (FIG. 1) is a thermoplastic material that, when 3D printed and cured, has elastic properties. In this embodiment, the shell 502 is able to stretch sufficiently to facilitate removal of the first support piece 400 and the second support piece 401 from the shell

502 (FIG. 15). Additionally, if the shell 502 is implemented as a case for phone, its elastic properties facilitate encasing a phone with the shell 502.

An additive manufacturing process 1600 that is carried out according to further embodiments will now be described with reference to the flow diagram of FIG. 16. It is assumed that the process is to be carried out by a 3D printer that is under the control of an operator. The steps do not have to be carried out in the order in which they appear in FIG. 1. They may, in fact, be reordered and combined with other steps.

As will be noted, a support piece may be introduced at any of a number of points in the process. The purpose of the support piece is to support the liquefied filament material until it strengthens sufficiently to maintain its shape (e.g., when it cures and hardens). Also, the support piece is freestanding so that it may be removed at any point after the overhang is sufficiently strong.

Figure 16:
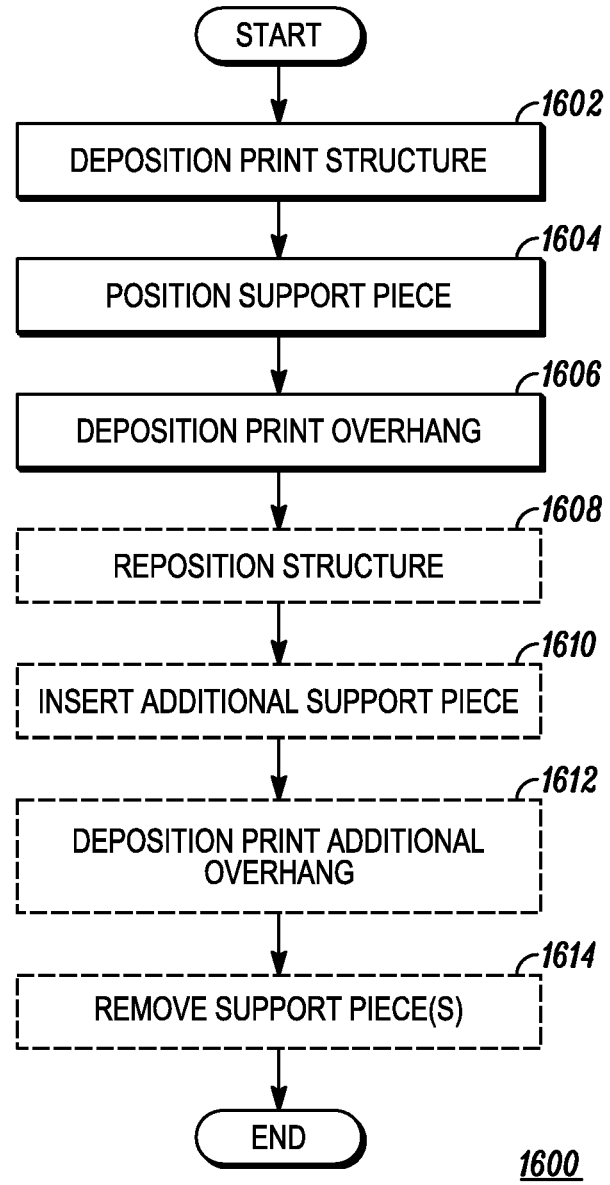
FIG. 16 is a flow diagram illustrating steps carried out according to various embodiments.

Turning to FIG. 16, a 3D printer prints a structure 200 (FIG. 2) onto a first print bed 110 (FIG. 1) at step 1602. There are a variety of forms that the structure 200 can take. These forms include: (1) a first wall 202 and a second wall 204 forming a first corner 201*b* (FIG. 2); (2) a first wall 202 and a second wall 204 (FIG. 2) with (a) at least one wall 204 lengthened (FIG. 2A); (b) forming a second corner 252 (FIG. 2A); and (c) defining a cavity 254 (FIG. 2A); (3) at least a first wall 202 and a second wall 204 of an enclosure 306 (FIG. 3); (4) at least a first extended wall 1202 and a second extended wall 1204 of an extended enclosure 1210 (FIG. 12); and; (5) a shell 502 having first face 318 and a second face 320 (FIG. 9).

At step 1604, the operator positions a first support piece 400 (FIG. 4). There are many ways in which the first support piece 400 may be positioned. These ways include (1) in the interior angle 201*a* of the first corner 201*b* (FIG. 2); (2) in the cavity 304 (FIG. 3); (3) within the enclosure 306 (FIG. 3); and (4) within the extended cavity 1210 (FIG. 12). Additionally, the support piece 400 may be implemented in a variety of ways, many of which have been described elsewhere in this disclosure (e.g., single section or multiple sections).

At step 1606, the 3D printer prints a first overhang 500. There are many possible methods of printing the first overhang 500, including: (1) extending from one or more of the first wall 202, the second wall 204, the third wall 206, and the fourth wall 208 (FIG. 5); (2) extending from one or more of the first wall extension 1202, the second wall extension 1204, the third wall extension 1206, and the fourth wall extension 1208 (FIG. 12); and (3) by depositing liquid onto one or more of the first wall 202, the second wall 204, the third wall 206, the fourth wall 208, and onto one or more of the first support piece 400 (FIG. 5) and the second support piece 401 (FIG. 13) or sections thereof.

The first overhang 500 (FIG. 5) is supported by the first support piece 400 (FIG. 4) or sections 400*a*, 400*b* thereof (FIG. 4). Additionally, the first overhang 500 has a variety of possible characteristics. For example, it may restrict an opening 1212 in a face 320 of the shell 502 (FIG. 12).

At optional step 1608, the operator repositions the 3D-printed structure 200 (FIG. 2). This can occur in a variety of ways, including where (1) the first overhang 500 is in contact with a surface of the second print bed 910 (FIG. 11); and (2) protrusions 900 on the second print bed 910 receive the first overhang 500 (FIG. 11).

At optional step 1610, the operator positions a second support piece 401 (FIG. 13). As with the first support piece 400 (FIG. 4), the second support piece 401 may be a single piece or may have at least a first section 401*a* and a second section 401*b* (FIG. 13). Furthermore, the operator may position the second support piece 401 so that one or more of the following is true: The second support piece 401 is (1) within the interior angle 201*a* of the corner 201*b* (FIG. 2); (2) in the cavity 304 (FIG. 3); (3) within the enclosure 306 (FIG. 3); (4) within the extended cavity 1210 (FIG. 12); or (5) stacked on the first support piece 400 (FIG. 13)

At optional step 1612, the 3D printer prints a second overhang 1400 (FIG. 14). The second overhang 1400 may have one or more of the following characteristics. The second overhang 1400 may: (1) restrict or close off an opening 1112 of the cavity 304 (FIG. 11); (2) restrict or close off an opening 1212 of an extended cavity 1210 (FIG. 12); and (3) restrict or close off a face 320 of the shell 502 (FIG. 12).

At optional step 1614, the operator removes one or more of the support pieces 400 and 401 (FIG. 15) (e.g., after the supported overhang cures, dries, and/or hardens to a point at which it needs no support). The support pieces 400 and 401 (FIG. 15) may be removed via (1) the first opening 302 of the first face 318 (FIG. 15); or (2) the second opening 1212 of the second face 320 (FIG. 13).

It can be seen from the foregoing that a method for additive manufacturing has been provided. In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

The invention claimed is:

1. A method comprising:
    additive manufacturing a first wall and a second wall that meet at an angle to form a first corner of a shell;
    positioning a first support piece proximal to the first wall and the second wall and within the interior of the angle;
    additive manufacturing a first overhang that extends from the first wall and the second wall onto the first support piece, the first overhang forming at least a portion of a first face of the shell, wherein the first support piece is freestanding with respect to the first wall and the second wall;
    positioning the shell such that the first face contacts a print bed and a second face of the shell faces up;
    positioning a second support piece within a portion of the shell that was repositioned; and
    additive manufacturing a second overhang that extends from the first wall or the second wall onto the second support piece.

2. The method of claim 1, wherein the first support piece includes a material selected from the group consisting of: Polytetrafluoroethylene, aluminum, stainless steel, anodized aluminum, and ceramic.

3. The method of claim 1, wherein the additive manufacturing the first wall and the second wall comprises:
    depositing a first liquid onto a print bed to form the first wall and the second wall and curing the first liquid to a solid state.

4. The method of claim 3, wherein the additive manufacturing the first overhang comprises:
    depositing a second liquid onto the first wall, second wall, and onto the first support piece.

5. The method of claim 1, wherein the additive manufacturing the first wall and the second wall comprises:

additive manufacturing the first wall and the second wall onto the print bed.

6. The method of claim 1, wherein the additive manufacturing the first wall and the second wall comprises:
lengthening at least the second wall to form a second corner,
wherein the first wall and the second wall as lengthened define a cavity,
wherein the positioning the first support piece comprises:
positioning the first support piece within the cavity, wherein the interior of the angle is within the cavity.

7. The method of claim 1,
wherein the first wall and the second wall form at least part of an enclosure,
wherein the positioning the first support piece comprises:
positioning the first support piece within the enclosure.

8. The method of claim 7,
wherein the first support piece comprises laterally interlocking sections,
the method further comprising:
removing one or more of the laterally interlocking sections from the enclosure.

9. The method of claim 1, wherein the shell has an interior cavity,
wherein the first face includes a first opening to the interior cavity,
wherein the second face includes a second opening to the interior cavity,
wherein the additive manufacturing the second overhang comprises:
additive manufacturing the second overhang that restricts the second opening.

10. The method of claim 9,
wherein the additive manufacturing the first wall and the second wall comprises:
additive manufacturing the first wall and the second wall onto an additional print bed.

11. The method of claim 9, further comprising:
additive manufacturing an extension to the first wall or the second wall, wherein the extension defines an extended cavity;
wherein the positioning the second support piece comprises:
stacking the second support piece onto the first support piece in the extended cavity, wherein the second support piece at least partly supports the second overhang; and
removing the first support piece and the second support piece through the first opening or the second opening.

12. The method of claim 10,
wherein the first support piece includes laterally interlocking sections;
wherein the second support piece includes laterally interlocking sections;
wherein the stacking the second support piece comprises:
stacking the laterally interlocking sections of the second support piece onto the laterally interlocking sections of the first support piece;
wherein the removing the first support piece comprises:
removing one or more of the laterally interlocking sections of the first support piece through the first opening; and
wherein the removing the second support piece comprises:
removing one or more of the laterally interlocking sections of the second support piece through the first opening.

13. A method for additive manufacturing comprising:
additive manufacturing walls of an enclosure on a print bed;
positioning a support piece within the enclosure on the print bed;
additive manufacturing an overhang extending from at least one of the walls onto the support piece, the overhang being at least partially supported by the support piece;
after additive manufacturing the overhang:
aligning the enclosure on a second print bed, and
additive manufacturing another overhang from at least one of the walls onto the support piece, the another overhang being at least partially supported by the support piece;
removing the enclosure from the print bed; and
removing the support piece from the enclosure.

14. The method of claim 13, wherein the support piece includes a surface material selected from the group consisting of: Polytetrafluoroethylene, aluminum, stainless steel, anodized aluminum, and ceramic.

15. The method of claim 13 further comprising, after aligning the enclosure on the second print bed and prior to additive manufacturing the another overhang:
additive manufacturing an extension of the walls to create an extended enclosure; and
positioning another support piece within the extended enclosure.

16. The method of claim 15, wherein the additive manufacturing the another overhang comprises:
additive manufacturing the another overhang extending from the extension of the walls and across the another support piece that is positioned within the extended enclosure,
wherein the another overhang closes off a face of the enclosure.

* * * * *

UNITED STATES PATENT AND TRADEMARK OFFICE
CERTIFICATE OF CORRECTION

| | |
|---|---|
| PATENT NO. | : 9,555,582 B2 |
| APPLICATION NO. | : 13/910336 |
| DATED | : January 31, 2017 |
| INVENTOR(S) | : Ali Javan Javidan et al. |

It is certified that error appears in the above-identified patent and that said Letters Patent is hereby corrected as shown below:

On the Title Page

At item (72), Line 2, "Carl A" should be -- Carl A. --.

At item (57), Line 7, "(1616)" should be -- (1614) --.

Signed and Sealed this
Fifteenth Day of August, 2017

Joseph Matal
*Performing the Functions and Duties of the*
*Under Secretary of Commerce for Intellectual Property and*
*Director of the United States Patent and Trademark Office*